Oct. 23, 1956 F. S. PEARNE Re. 24,230

PORTABLE LIFT

Original Filed Jan. 17, 1952 2 Sheets-Sheet 1

INVENTOR.
FRANK S. PEARNE
BY
Ely, Pearne & Gordon

Oct. 23, 1956 F. S. PEARNE Re. 24,230

PORTABLE LIFT

Original Filed Jan. 17, 1952 2 Sheets-Sheet 2

INVENTOR.
FRANK S. PEARNE
BY
Ely, Pearne & Gordon

United States Patent Office

Re. 24,230
Reissued Oct. 23, 1956

24,230

PORTABLE LIFT

Frank S. Pearne, Alhambra, Calif., assignor to Regent Jack Mfg. Co., Inc., Los Angeles, Calif., a corporation of California Original No. 2,734,716, dated February 14, 1956, Serial No. 266,905, January 17, 1952. Application for reissue June 1, 1956, Serial No. 588,937

17 Claims. (Cl. 254—1)

Figure 1:
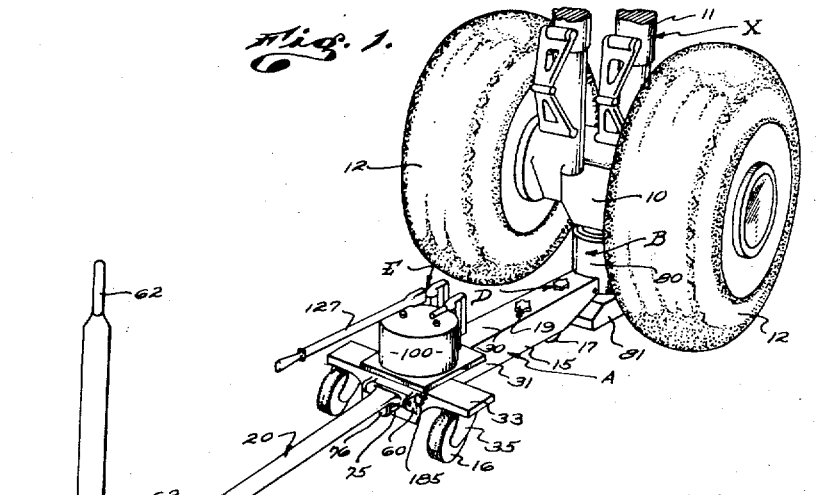

Matter enclosed in heavy brackets [ ] appears in the original patent but forms no part of this reissue specification; matter printed in italics indicates the additions made by reissue.

This invention has to do with a portable lift, it being a general object of the invention to provide a portable or mobile device that is simple and convenient to manipulate and which is effective and dependable for effecting the lifting or elevating of work such, for example, as vehicles of various kinds, or any loads requiring elevation. The lift provided by the present invention can be used to advantage in various situations and since it is particularly useful and practical for the handling of aircraft, or the like, it will be described in that connection or for that use, though such reference is not to be construed in any way as limiting or restricting the invention.

In the case of aircraft, particularly in the case of heavy commercial as well as military craft, it is not uncommon that a supporting element of the craft involving ground engaging wheels requires elevation or lifting. In a typical situation a depending unit of landing gear carrying ground engaging wheels may require elevation and for purpose of example the lift provided by the present invention has been illustrated for performing this service and will be described in this connection.

A general object of the invention is to provide a lift that is portable or mobile, being characterized by a wheel supported carriage, and the various essential elements of the structure are so combined and related as to provide a structure that can be easily operated or manipulated and which is particularly practical, effective and dependable for service such as lifting an element or unit of aircraft landing gear, or for performing other like or similar operations.

Another object of the invention is to provide a lift of the general character referred to wherein the wheel supported carriage *comprises* [has] an elongate rigid frame *provided* with a vertically shiftable draw bar projecting from the forward end thereof and maintained in alignment with the *carriage* frame, while the forward end portion of the frame is supported by caster wheels and the rear end portion of the frame is supported by a single wheel shiftable vertically relative to the frame and operable from the draw bar to effect vertical movement of the rear end portion of the frame in a manner to operate the jack carried thereby relative to the ground against which the jack is to operate.

Another object of this invention is to provide a lift of the general character referred to wherein the jack element of the mechanism is pivotally connected to the rear end portion of the frame of the carriage and an adjustable stop means normally yieldingly supports the jack in a predetermined position relative to the frame of the carriage.

It is another object of this invention to provide a lift of the general character referred to including a fluid supply means by which fluid under pressure is supplied to the jack and including safety features and controls making the structure or mechanism safe to use and simple and convenient to operate.

The structure provided by the present invention is characterized by a wheel supported carriage [having] *comprising* an elongate frame, *the carriage having* front supporting wheels and a single rear supporting wheel. The frame has a flat top extending lengthwise thereof and has side flanges depending from the top defining an elongate cavity that opens downwardly. A head is provided at the forward end of the frame and has arm portions projecting laterally in opposite directions. The front or forward supporting wheels are carried by the arms of the frame and are preferably castered on or to the arms. The single rear supporting wheel is carried by a yoke located in the cavity of the frame. The neck end of the yoke is pivoted to the frame while the arms of the yoke extend rearwardly and at the rear portion of the *frame* [carriage] support an axle that carries the single rear supporting wheel. A spring means, preferably an adjustable means, normally yieldingly holds the yoke in a position where the rear supporting wheel projects down from the frame so the frame is supported in a substantially horizontal position. An operating means for the yoke includes a toggle mechanism connecting the yoke and the frame and an operating rod connected to the toggle mechanism and extending forward therefrom to the forward end portion of the frame. The operating rod is adapted to be operated by a draw bar provided at the forward end of the frame and the parts are related so that when the draw bar is lowered to a down position the operating rod actuates the toggle mechanism so that the yoke *pivots on* [is elevated relative to] the frame of the carriage, causing the rear end portion of the carriage to be in a down position. A spring means is provided normally supporting the [yoke in a down position relative to the frame of the carriage] *carriage frame in a raised position relative to the yoke.*

A jack is included in the structure and is preferably a hydraulic jack located at the rear end portion of the carriage and connected thereto by a means that provides for pivotal movement of the jack relative to the frame of the carriage. In a typical form the jack has a cylinder pivotally connected to the rear end of the frame of the carriage and a base is provided at the lower end of the cylinder and is adapted to engage the ground. A plurality of ram elements is carried by the cylinder and the elements are telescopically related so that when fluid is supplied to the jack under pressure the ram elements are elevated and extend upwardly from the cylinder so that a head at the upper end of the innermost ram element engages the work to be lifted.

A fluid supply means is provided and in accordance with the invention includes a fluid reservoir located at the forward end portion of the carriage, a pump mechanism adjacent the reservoir and preferably such as to be manually operated and characterized by a movable cylinder construction by which fluid can be delivered at a substantial rate for rapid operation of the jack, to be followed by high pressure operation. Flexible fluid handling ducts connect the fluid handling parts at the forward end portion of the structure with the jack at the rear end portion of the structure, and suitable control means are included providing a structure convenient and practical to operate.

Figure 2:
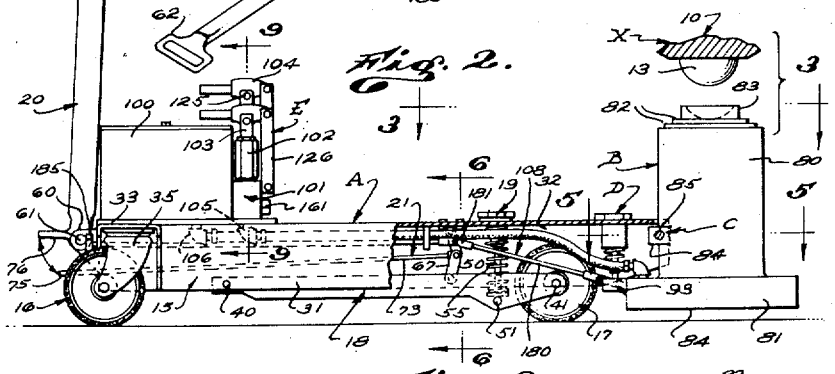
Figure 3:
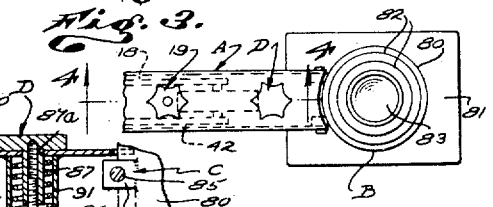
Figure 4:
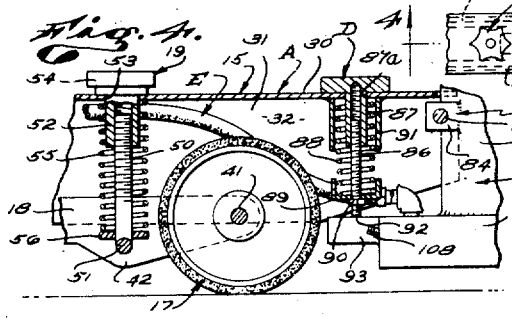
Figure 5:
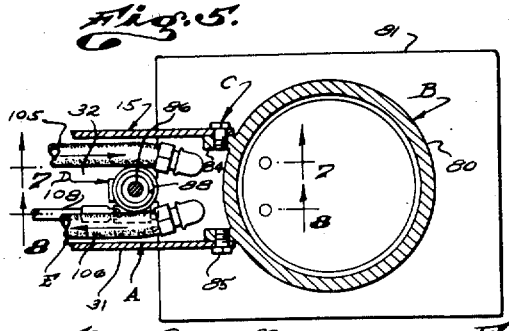
Figure 6:
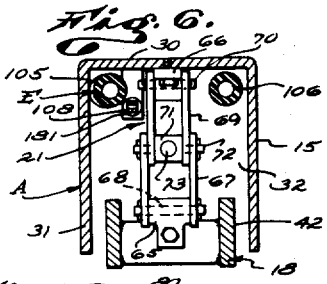
Figure 7:
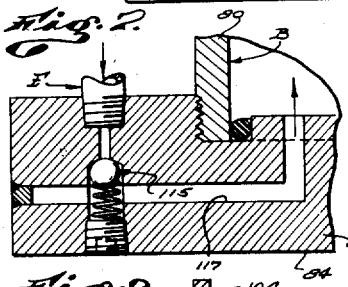
Figure 8:
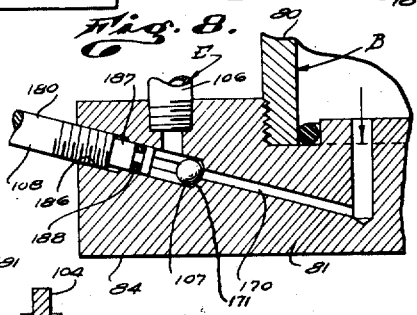
Figure 9:
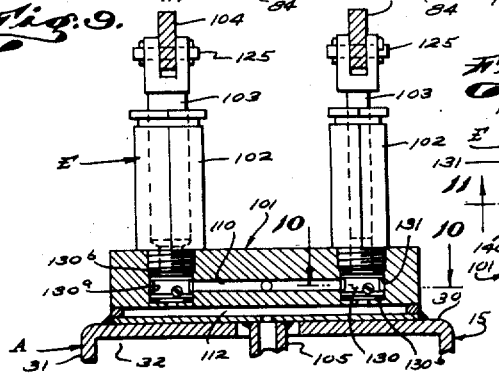
Figure 10:
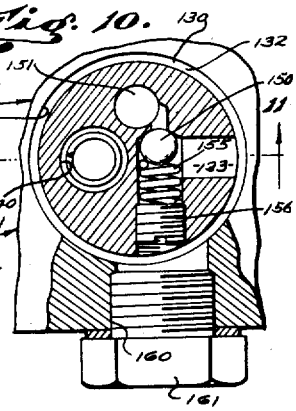
Figure 11:
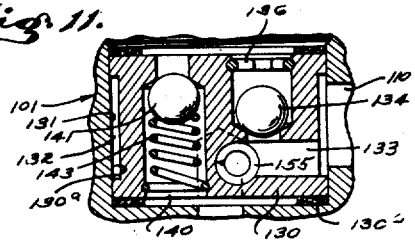

The various objects and features of my invention will be fully understood from the following detailed description of a typical preferred form and application of my invention, throughout which description reference is made to the accompanying drawings, in which:

Fig. 1 is a perspective view showing a lift incorporating the present invention being employed to operate the landing gear unit of an aircraft. Fig. 2 is a side elevation of the lift provided by the invention, showing the draw bar thereof in an elevated position with certain parts being broken away to illustrate detailsof construction. Fig. 3 is a plan view of a part of the structure, being a view taken as indicated by line 3—3 on Fig. 2. Fig. 4 is an enlarged detailed sectional view of a portion of the structure, being a view taken substantially as indicated by line 4—4 on Fig. 3. Fig. 5 is an enlarged plan section taken as indicated by line 5—5 on Fig. 2. Fig. 6 is an enlarged transverse sectional view taken as indicated by line 6—6 on Fig. 2. Fig. 7 is an enlarged detailed section taken as indicated by line 7—7 on Fig. 5. Fig. 8 is an enlarged detailed section taken as indicated by line 8—8 on Fig. 5. Fig. 9 is an enlarged detailed sectional view taken as indicated by line 9—9 on Fig. 2. Fig. 10 is an enlarged plan section taken by line 10—10 on Fig. 9, and Fig. 11 is a vertical section taken as indicated by line 11—11 on Fig. 10.

The lift embodying the present invention is shown in a form and as including details making it particularly useful for the handling of aircraft, and in the drawings it is shown in connection with or as handling a unit X of an aircraft landing gear, which unit includes a housing 10 carried by struts 11 and supporting a pair of wheels 12. The housing 10 is disposed between the wheels 12 and is illustrated as having a downwardly projecting spherically curved part 13 adapted to be engaged by the lift of the present invention.

The lift embodying the present invention includes, generally, a wheel supported carriage A, a hydraulic jack B, means C connecting the jack and the carriage, means D normally yieldingly stopping the jack in a predetermined position relative to the carriage, fluid supply means E with elements supported by the carriage and serving to supply operating fluid to the jack B, and various other elements and features of construction, the details of which will be hereinafter described.

The wheel supported carriage A [has] *comprising* an elongate rigid frame 15[,] *is movably supported for horizontal travel on structure including* front supporting wheels 16, a single rear supporting wheel 17, a yoke 18 connected to the frame 15 and carrying the wheel 17, means 19 normally yieldingly holding the yoke relative to the frame so that the wheel 17 supports the rear end portion of the frame in an up and substantially horizontal position, a draw bar 20 pivotally connected to the forward end of the frame A for vertical movement and to be maintained in alignment with the frame, and operating means 21 for the yoke 18 adapted to be actuated by the draw bar 20 to shift the yoke relative to the frame so the lower end portion of the frame is moved to a down position under which condition the frame extends rearwardly and downwardly.

The frame A of the carriage may, in practice, be varied widely in form and construction and, in practice, it will be varied in size, shape and proportioning, depending upon the class of service to be handled by the lift. In the case illustrated the frame A is an elongate rigid unit having a flat top 30 extending lengthwise of the carriage and having depending side flanges 31 depending from the top 30. These elements of the frame A cooperate to form or define a downwardly opening cavity 32 in the frame, which cavity extends lengthwise of the frame.

A head is formed or provided at the forward end of frame A and preferably includes arms 33 fixed to the forward end portion of the structure formed by the top 30 and flanges 31, and projecting laterally and in opposite directions from these parts.

The front or forward supporting wheels 16 are located beneath the arms 33 and are connected thereto by caster mountings 35 which, in practice, may be of typical construction common to caster mechanisms and which support the wheels 16 so that they swing or turn about vertical axes and readily track or position themselves relative to the direction in which the carriage is operated.

The rear supporting wheel 17 [of] *for* the carriage is located in the cavity 32 at the rear end portion of the carriage and is connected to or with the frame 15 by means of the yoke 18.

The yoke 18 is an elongate unit located in the cavity 32 and extending lengthwise of the frame 15 and it is preferably proportioned relative to the frame so that it extends from the forward end portion of the frame rearwardly to a point beneath the rear end portion of the frame where it supports the wheel 17. In the case illustrated a horizontally disposed pivot pin 40 extends between the flanges 31 and supports the neck or forward end portion of the yoke between the flanges. An axle 41 is carried by the terminal or rear end portions of the arms 42 of the yoke. The wheel 17 is located between the arms 42 and is carried on the axle 41.

The means 19 normally yieldingly supports the [yoke 18] *frame 15* in a position relative to [frame 15] *yoke 18* so that the [rear supporting wheel 17 is in a down position relative to the rear end portion of the frame 15, in which case the] frame 15 is supported in an up position where it is substantially horizontal, as shown in Fig. 2 of the drawings. The means 19, best illustrated in Fig. 4 of the drawings, includes a stem 50 carried by a pivot pin 51 that extends between and which is rotatably supported by the arms 42. The stem 50 projects upwardly and carries a stop 52 which is engaged through an opening 53 in the top 30 of the frame 15. The stop 52 is threaded on the stem 50 so that it can be adjusted lengthwise of the stem, and the stop has a head 54 which seats or stops against the upper side of the top 30. A spring 55, preferably a helical spring, surrounds the stem and bears against the lower side of the top 30 and against a seat 56 carried by the stem 50 and resting on the pivot pin 51. The spring 55 is of such a strength as to normally yieldingly hold the yoke 18 stopped in the down position shown in Figs. 2 and 4.

The draw bar 20 is an elongate rigid element having its inner end engaged between spaced lugs 60 that project from the forward end of frame 15. A pivot pin 61 pivotally connects the draw bar and the lugs 60 so that the draw bar is free to swing about the horizontal axis that extends transversely of the carriage at the forward end thereof. The draw bar is confined between the lugs 60 so that it is maintained in alignment with the frame, that is, in a plane that extends longitudinally of the frame of the carriage. In practice the draw bar is of suitable length and it may be provided at its outer or forward end with a handle 62, as shown in the drawings.

The operating means 21 is provided for shifting the yoke 18 relative to the frame 15 [to effect movement of the wheel 17 toward the top 30 of the frame] in order to lower the rear end portion of the frame from the horizontal position shown in Figs. 2 and 4. The operating means, as shown in the drawings, involves a toggle mechanism and an operating connection between the toggle mechanism and the draw bar. The particular toggle mechanism shown in the drawings is located in the cavity 32 of the frame and includes a block 65 secured between the arms 42 of the yoke at a point spaced a substantial distance from the pivot 40. A block 66 is secured to the lower side of the top 30 above block 65. A pair of lower links 67 is pivoted to the block 65 by a pivot pin 68 and a pair of upper links 69 is pivoted to the upper block 66 by a pivot pin 70. A pivot block 71 is provided between the pairs of links and carries a pivot pin 72 by which the links are pivotally connected.

The means provided for operating the toggle mechanism includes an operating rod 73 anchored or secured to the pivot block 71 and extending forward therefrom in the cavity 32 to the forward end portion of the frame where it has an exposed or forwardly projecting end portion 75. An operating arm 76 projects from the draw bar 20 and is related to the forward end portion 75 of the rod 73 so that when the draw bar is lowered to a down position where it extends forward and possibly somewhat downward from the forward end of the frame 15 the rod 73 is pushed rearwardly causing the toggle mechanism to shift the yoke 18 relative to the rear end portion of the frame, moving the structure to a position where the rear end portion of the frame is in a down position or lowered from that shown in Figs. 2 and 4. The operating arm 76 is out of engagement with the rod 73 when the draw bar is being used to draw or manipulate the carriage or when it is in an up position such as is shown in Fig. 2 of the drawing.

The jack B is a hydraulic jack mechanism located at the rear end of the carriage A, and in the particular case illustrated the jack is of the extensible type, being characterized by a cylinder 80 having a base 81 at its lower end and a plurality of ram elements 82 within the cylinder and telescopically related. The innermost ram element is provided with a head 83 fashioned to cooperate with or receive the structure to be elevated, for instance, to receive the part 13 hereinabove described. The base 81 on the cylinder 80 is in the nature of a plate or an enlargement having a flat bottom 84 that can be finished or surfaced as desired to provide suitable engagement between the jack and the ground.

The means C connects the jack B and the frame 15 of the carriage A. In the case illustrated the means C includes lugs 84 projecting from the cylinder 80 and overlapping the rear end portions of the flanges 31 of frame 15. Pivot members 85 pivotally connect the lugs 84 and the flanges 31 so that the jack is pivotally connected to the frame 15 on a horizontal axis extending transverse of the carriage and to the rear end of the frame. The stop means D serves to normally yieldingly stop the jack in a position where it extends vertically as the frame of the carriage extends horizontally and it is best illustrated in Fig. 4 of the drawings.

In the case illustrated the stop means D includes a stop pin 86 carried by a stop 87 engaged through an opening 88 provided in the top 30 of frame 15. The stop pin 86 is threaded to the stop 87 to provide for adjustment between these parts. A spring 88, preferably a helical spring is under compression between the top 30 of the frame 15 and a seat 89 supported on the pin 86 by a nut 90 which is adjustable on the pin. The spring 88 is held in position by a suitable guide 91 and it normally yieldingly holds the stop pin in a down position. The parts just described are arranged and related so that the lower end 92 of the stop pin is in the path of the base 81, or of a lug 93 on the base 81, as the jack tends to turn or swing about the pivotal connection C under the influence of gravity.

The fluid supply means E includes, generally, a reservoir 100 supported by the carriage A, preferably at the forward end portion thereof, a pump mechanism preferably adjacent the reservoir 100 and characterized by a body 101 carrying cylinders 102 provided with rams 103 operated by levers 104. A fluid connection 105 is provided from the pump mechanism to the jack and a fluid connection 106 is provided from the jack to the reservoir. An exhaust valve 107 is provided controlling flow from the jack to the reservoir and an operating means 108 is provided whereby the valve 107 can be conveniently operated from the forward end of the carriage A.

The reservoir 100 is provided to carry a suitable and adequate supply of fluid for the jack and is preferably mounted on the forward end portion of the frame 15 of carriage A. In the preferred arrangement the pump mechanism is mounted adjacent the reservoir 100 and immediately rearward thereof, as shown throughout the drawings.

The body 101 of the pump mechanism is formed to have a chamber 110 in communication with the reservoir. A second chamber 112 is provided in the body and is in communication with the pressure supply line 105 which extends from the body 101 through the cavity 32 of the frame to the jack, where it is adapted to supply operating fluid to the jack through a check valve 115. The line 105 is preferably in the form of a flexible duct and the check valve 115 is preferably carried in the base 81 of the cylinder 80 and is a spring loaded ball check valve controlling flow of fluid through the port 117 so that fluid can flow from duct 105 into the cylinder 80 but cannot return. This particular valve is best illustrated in Fig. 7 of the drawings.

In accordance with the invention the pump mechanism involves a plurality of cylinders 102, each in communication with chamber 110 and also in communication with chamber 112 through a valve mechanism the details of which are best illustrated in Figs. 9, 10, and 11, of the drawings. In the preferred arrangement the cylinders 102 carry rams 103 of different sizes or diameters so that one of the cylinders is of substantial size and is such as to handle a substantial volume of fluid, whereas the other is of limited size and adapted to handle a limited amount of fluid but at a high pressure.

In the case illustrated and in accordance with the preferred form of the invention an operating lever 104 is connected to the upper end of each ram 103 and a pivot pin 125 and links 126 pivotally connect or anchor the operating levers, as illustrated in Fig. 2 of the drawings. In the preferred construction [and] *an* operating handle 127 is provided and is an element of substantial length adapted to be slidably engaged with either one of the levers 104 to provide an element by which either one or the other of the rams can be operated, as circumstances require. If desired a handle can be provided on each lever. However, in practice, ordinarily one handle is all that is necessary as it can be readily switched from one lever 104 to the other, as circumstances require.

In accordance with the preferred form of the invention the levers 104 are not only located at the forward end portion of the carriage but they are disposed to extend or project forwardly of the carriage. With the levers thus arranged the handle, when engaged with a lever, projects forward from the carriage, preferably substantially parallel therewith, and is accessible for manual operation forward of the front end of the carriage, as clearly illustrated in Fig. 1 of the drawings.

The valve mechanism for each cylinder of the pump structure includes a valve block 130 inserted in a chest 131 in communication with the chambers 110 and 112. The valve block is shown as provided with an annular recess 132 maintained in communication with chamber 110 and a port 133 extends from the recess 132 through the block to open into the cylinder. An inlet valve 134 controls flow through the port 133 so that fluid can flow in one direction only through the port 133, that is, only from chamber 110 into the cylinder. The inlet valve 134 is shown as a ball valve maintained in operating position by a snap ring 136. An opening or port 140 extends through the valve block 130 connecting chamber 112 and the cylinder. An outlet valve 141 controls flow through the port 140 and is preferably a ball valve normally held seated by a spring 143.

In the preferred form of the invention, the valve block 130 as provided by the invention is a spool-like unit having the recess 132 in its periphery and it is located in a socket 130[a] provided in the body 101. The cylinder 102 cooperating with the valve block is threaded into the outer portion or mouth of the socket 130[a] and confines the block in the socket. In the preferred construction suitable washers or seals 130[b] are provided at the ends of the block sealing with the bottom of the socket and with the end of the cylinder that is engaged in the socket.

In accordance with the invention a relief or safety valve 150 is provided in the valve block 130 and controls flow from chamber 112 through a port 151 which extends from the chamber 112 to a point where it connects with port 133. The valve 150 is preferably a ball valve normally held seated by a heavy spring 155 held in position by an adjustable stop 156. The stop 156 is threaded in an opening provided in the valve block 130 and is accessible through an opening 160 provided in the body 101 and normally closed by a plug 161. The valve 150 provides for by-passing fluid back to the reservoir when pressure in the pump exceeds a predetermined pressure.

From the foregoing description and from a consideration of the figures appearing on sheet 2 of the drawings it will be apparent that operation of either lever 104 will result in fluid being pumped from the reservoir 100 to the line 105 which conducts it to the jack. Such pumped fluid results in operation or elevation of the jack. For initial operation of the jack it is preferred to operate the large ram so that the jack is rapidly extended or operated until the load is encountered. When the load is to be operated or moved the small plunger can be operated, delivering fluid at high pressure to the line 105 for slow but forceful operation of the jack.

The return or exhaust valve 107 is preferably carried by the base of the jack B to control outflow through a port 170 provided in the base of the jack, as shown in Fig. 8 of the drawings. The port 170 connects the interior of the cylinder 80 and the return duct or line 106.

The valve 107 is preferably a simple ball valve cooperating with a seat 171 so that pressures of fluid tending to escape from the cylinder 80 tends to lift or open the valve 107.

The control or operating means 108 for the valve 107 preferably includes an operating rod 180 extending lengthwise through the cavity of the frame 15. In the case illustrated the rod 180 has two sections connected by a universal joint 181. One of the sections of the rod extends forward from the universal joint 181 to the front or forward end of the frame, where it is provided with a conveniently accessible operating knob 185. The other section of the rod extends rearwardly from the universal joint and has threaded engagement with the base of the jack at 186. An extension 187 of the last mentioned section of the operating rod is sealed with the base by a sealing ring 188 and engages the valve 107. When the operating rod is rotated in one direction it advances against the valve 107 and it can be operated to a position where the valve 107 is positively held against the seat 171. During operation or elevation of the jack the valve 107 is thus set or held closed. When it is desired to release the jack the operating rod 108 is rotated in a manner to free the valve 107 allowing it to leave the seat 171 so that fluid freely passes through port 170 to the outlet duct 106.

From the foregoing description it will be apparent that I have by my present invention provided a mobile or portable lift that can be readily moved from one location to another and which can be readily and conveniently manipulated to locate the jack element of the lift in the desired position beneath the element which is to be elevated. The operation of the mechanism is very simple and, as above described, to effect operation of the jack it is merely necessary to close valve 107 and then operate one or the other, or possibly both, of the rams of the pump mechanism. The operation of either pump ram results in forcing of fluid from the reservoir 100 into the jack, with consequent operation thereof. When the desired operation has been completed and it is desired to remove the jack, valve 107 is opened and the fluid from the jack returns through line 107 to the reservoir. It will be understood from the foregoing description and from the drawings that the mechanism can be operated as just described, causing the jack to engage the load which is to be lifted, whereupon the base 81 of the cylinder 80 will move down until it engages the ground, and in so moving it will carry with it the lower end portion of the frame of the carriage.

If desired the base 81 of the jack can be engaged with the ground or it can be lowered prior to the jack being operated, or following operation of the jack and lifting of the load or aircraft, as circumstances may require. This is accomplished by lowering the draw bar to operate the rod 73 so that the toggle mechanism between the yoke 80 and the frame is operated, causing the yoke to shift relative to the frame, with resulting lowering of the rear end portion of the frame. It is significant to observe that the entire operation of the structure can be carried out from the forward end portion of the carriage, with the result that the jack, which is at the rear end portion of the carriage, can be advantageously arranged at locations that are somewhat inaccessible.

By providing the carriage A with a rigid elongate frame having a top and depending side flanges, the frame forms the cavity 32 hereinabove referred to. It is to be noted that the various parts of the mechanism that operate or which are likely to become fouled, or which might, if at the exterior of the structure, project in a manner to be objectionable, are located in or confined to the cavity 32. Through this construction, arrangement and relationship of parts, and by locating the flexible ducts 105 and 106 in the cavity 32, the mechanism as a whole is made compact, is free of undesirable external features of construction, and the parts subject to injury are shielded or protected and yet the structure is without specially provided protective housings, covers, or other such accessories.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In combination, a vertically shiftable elongate substantially horizontal wheel supported carriage, a substantially vertical hydraulic cylinder and piston mechanism pivotally connected to the rear end of the carriage on a horizontal axis extending transversely of the carriage, and means supplying operating fluid to the cylinder including a fluid reservoir supported by the carriage at the forward end portion thereof, a pump having an operating lever accessible at the forward end portion of the carriage, and a fluid handling duct extending from the pump to the cylinder.

2. In combination, a vertically shiftable elongate substantially horizontal wheel supported carriage, a substantially vertical hydraulic cylinder and piston mechanism pivotally connected to the rear end of the carriage on a horizontal axis extending transversely of the carriage, and means supplying operating fluid to the cylinder including a fluid reservoir supported by the carriage at the forward end portion thereof, a pump having an operating lever accessible at the forward end portion of the carriage, and a fluid handling duct extending from the pump to the cylinder, a rear supporting wheel shiftable vertically relative to the rear end portion of the carriage, and means normally yieldingly holding the wheel and carriage related so the carriage is in an up position supporting the cylinder and piston mechanism spaced above the level of the bottom of the wheel.

3. In combination, a vertically shiftable elongate substantially horizontal wheel supported carriage, a substantially vertical hydraulic cylinder and piston mechanism pivotally connected to the rear end of the carriage on a horizontal axis extending transversely of the carriage, and means supplying operating fluid to the cylinder including a fluid reservoir supported by the carriage at the forward end portion thereof, a pump having an operating lever accessible at the forward end portion of the carriage, and a fluid handling duct extending from the pump to the cylinder, a yoke pivoted to the carriage and having arms projecting rearwardly at the rear end portion of the carriage, a rear supporting wheel carried by the projecting portions of the arms, and means normally yieldingly holding the yoke in a predetermined down position relative to the carriage.

4. In combination, a vertically shiftable elongate substantially horizontal wheel supported carriage, a substantially vertical hydraulic cylinder and piston mechanism pivotally connected to the rear end of the carriage on a horizontal axis extending transversely of the carriage, and means supplying operating fluid to the cylinder including a fluid reservoir supported by the carriage at the forward end portion thereof, a pump having an operating lever accessible at the forward end portion of the carriage, and a fluid handling duct extending from the pump to the cylinder, a rear supporting wheel shiftable vertically relative to the rear end portion of the carriage, means adapted to operate the wheel relative to the carriage to a position where the rear end portion of the carriage is down and the cylinder and piston mechanism is flush with the bottom of the wheel, and means normally yieldingly holding the wheel and carriage related so the carriage is in an up position supporting the cylinder and piston mechanism spaced above the level of the bottom of the wheel.

5. In combination, a vertically shiftable elongate substantially horizontal wheel supported carriage, a substantially vertical hydraulic cylinder and piston mechanism pivotally connected to the rear end of the carriage on a horizontal axis extending transversely of the carriage, and means supplying operating fluid to the cylinder including a fluid reservoir supported by the carriage at the forward end portion thereof, a pump having an operating lever accessible at the forward end portion of the carriage, and a fluid handling duct extending from the pump to the cylinder, a yoke pivoted to the carriage and having arms projecting rearwardly at the rear end portion of the carriage, a rear supporting wheel carried by the projecting portions of the arms, means normally yieldingly holding the yoke in a predetermined down position relative to the carriage, a toggle mechanism adapted to move the yoke toward the carriage, and an operator adapted to operate said toggle mechanism and having a part accessible at the forward end portion of the carriage.

6. In combination, a vertically shiftable elongate substantially horizontal wheel supported carriage, a substantially vertical hydraulic cylinder and piston mechanism pivotally connected to the rear end of the carriage on a horizontal axis extending transversely of the carriage, and means supplying operating fluid to the cylinder including a fluid reservoir supported by the carriage at the forward end portion thereof, a pump having an operating lever accessible at the forward end portion of the carriage, and a fluid handling duct extending from the pump to the cylinder, the carriage having a downwardly opening cavity and the duct being located in the cavity.

7. In combination, a vertically shiftable elongate substantially horizontal wheel supported carriage, a substantially vertical hydraulic cylinder and piston mechanism pivotally connected to the rear end of the carriage on a horizontal axis extending transversely of the carriage, and means supplying operating fluid to the cylinder including a fluid reservoir supported by the carriage at the forward end portion thereof, a pump having an operating lever accessible at the forward end portion of the carriage, and a fluid handling duct extending from the pump to the cylinder, a rear supporting wheel shiftable vertically relative to the rear end portion of the carriage, and means normally yieldingly holding the wheel and carriage related so the frame is in an up position supporting the cylinder and piston mechanism spaced above the level of the bottom of the wheel, the carriage having a top and side flanges defining a cavity carrying the duct, and the rear supporting wheel.

8. In combination, a vertically shiftable elongate substantially horizontal wheel supported carriage, a substantially vertical hydraulic cylinder and piston mechanism pivotally connected to the rear end of the carriage on a horizontal axis extending transversely of the carriage, and means supplying operating fluid to the cylinder including a fluid reservoir supported by the carriage at the forward end portion thereof, a pump having an operating lever accessible at the forward end portion of the carriage, and a fluid handling duct extending from the pump to the cylinder, a yoke pivoted to the carriage and having arms projecting rearwardly at the rear end portion of the carriage, a rear supporting wheel carried by the projecting portions of the arms, and means normally yieldingly holding the yoke in a predetermined down position relative to the carriage, the carriage having a top and side flanges defining a cavity carrying the duct, the yoke, the rear supporting wheel and said means.

9. In combination, a vertically shiftable elongate substantially horizontal wheel supported carriage, a substantially vertical hydraulic cylinder and piston mechanism pivotally connected to the rear end of the carriage on a horizontal axis extending transversely of the carriage, and means supplying operating fluid to the cylinder including a fluid reservoir supported by the carriage at the forward end portion thereof, a pump having an operating lever accessible at the forward end portion of the carriage, a flexible duct adapted to deliver fluid from the pump to the cylinder, a flexible duct adapted to return fluid from the cylinder to the reservoir, and a manually operable escape valve controlling flow from the cylinder to the last mentioned duct.

10. In combination, a vertically shiftable elongate substantially horizontal wheel supported carriage, a substantially vertical hydraulic cylinder and piston mechanism pivotally connected to the rear end of the carriage on a horizontal axis extending transversely of the carriage, and means supplying operating fluid to the cylinder including a fluid reservoir supported by the carriage at the forward end portion thereof, a pump having an operating lever accessible at the forward end portion of the carriage, a flexible duct adapted to deliver fluid from the pump to the cylinder, a flexible duct adapted to return fluid from the cylinder to the reservoir, a manually operable escape valve controlling flow from the cylinder to the last mentioned duct, and an operating member adapted to control said valve and extending therefrom to the forward end portion of the carriage.

11. In combination, a vertically shiftable elongate substantially horizontal wheel supported carriage, a substantially vertical hydraulic cylinder and piston mechanism pivotally connected to the rear end of the carriage on a horizontal axis extending transversely of the carriage, and means supplying operating fluid to the cylinder including a fluid reservoir supported by the carriage at the forward end portion thereof, a pump having an operating lever accessible at the forward end portion of the carriage, and a fluid handling duct extending from the pump to the cylinder, a yoke pivoted to the carriage and having arms projecting rearwardly at the rear end portion of the carriage, a rear supporting wheel carried by the projecting portions of the arms, means normally yieldingly holding the yoke in a predetermined down position relative to the carriage, a draw bar pivoted to the forward end portion of the carriage and confined to movement in a plane disposed longitudinally of the carriage, the carriage having a caster wheel support at the forward end thereof, a toggle mechanism adapted to move the yoke toward the carriage, and an operator adapted to operate said toggle mechanism and having a part accessible at the forward end portion of the carriage adapted to be operated by the draw bar.

*12. In a portable lift, the combination of a wheel supported carriage including means defining a fluid reservoir, an hydraulic cylinder and piston lift mechanism mounted adjacent one end of said carriage for bodily movement relative thereto between a normal raised position and a load-supporting position in which said mechanism rests on the ground, yieldable means biased to hold said mech-*

*anism in said normal raised position and yieldable to permit movement thereof relative to said carriage to said load-supporting position, and means including flexible conduit for effecting fluid flow between said reservoir and said mechanism for extending and retracting the cylinder and piston.*

*13. In a portable lift, the combination of a wheel supported carriage, means on said carriage defining a fluid reservoir, an hydraulic cylinder and piston lift mechanism including a base having a flat bottom and a cylinder and piston mounted on said base for extension and retraction in a direction normal to said flat bottom, said mechanism being mounted adjacent one end of said carriage for bodily movement relative thereto between a normal raised position and a load-lifting position in which the bottom of said base rests on the ground, yieldable means biased to hold said mechanism in said normal raised position and yieldable to permit movement thereof relative to said carriage to said load-lifting position, and means including flexible conduit for effecting fluid flow between said reservoir and said mechanism for extending and retracting the cylinder and piston while accommodating bodily movement of said mechanism relative to said carriage.*

*14. In a portable lift, the combination of a carriage, wheels supporting said carriage, an hydraulic cylinder and piston lift mechanism mounted adjacent one end of said carriage for bodily movement relative thereto, said mechanism comprising a base having a flat bottom and a cooperating cylinder and piston mounted on said base for extension and retraction in a direction normal to said flat bottom, means on said carriage defining a fluid reservoir, means for effecting fluid flow between said reservoir and said mechanism for actuating said cylinder and piston, a connection including yieldable restraining means acting between said carriage and said mechanism to permit movement of the latter relative to said carriage from a normal raised position to a load-lifting position in which said flat bottom engages the ground when a downwardly directed load is applied thereto, said carriage and said hydraulic cylinder and piston mechanism being so related that the carriage remains supported by said wheels when said flat bottom is engaged with the ground.*

*15. In a portable lift, the combination of a wheel supported carriage having a pair of wheels permanently supporting one end thereof in an elevated position, an hydraulic cylinder and piston lift mechanism disposed substantially beyond the opposite end of said carriage, said mechanism comprising a base having a flat bottom and a cooperating cylinder and piston mounted on said base for extension and retraction in a direction normal to said flat bottom, means connecting said mechanism to said carriage for bodily movement relative thereto when a load is applied downwardly on said mechanism to engage said flat bottom thereof with the ground, and means including a third wheel yieldably supporting said mechanism with said flat bottom spaced from the ground, said carriage and mechanism being so related that the carriage remains spaced from the ground when the flat bottom of said mechanism has been lowered into engagement therewith.*

*16. In a portable lift, the combination of a wheel supported carriage having a pair of wheels permanently supporting one end thereof in an elevated position, an hydraulic cylinder and piston lift mechanism disposed substantially beyond the opposite end of said carriage, said mechanism comprising a base having a flat bottom and a cooperating cylinder and piston mounted on said base for extension and retraction in a direction normal to said flat bottom, means connecting said mechanism to said carriage for pivotal movement with respect thereto about a horizontal axis extending transversely of the carriage, and means including a third wheel for yieldably supporting said mechanism and the adjacent end of said carriage in elevated positions, said mechanism and said carriage being normally disposed at such relative elevations that lowering of said adjacent end of the carriage in opposition to said yieldable means will engage the flat bottom of the base of said mechanism with the ground.*

*17. In a portable lift, the combination of a carriage, wheels supporting said carriage, an hydraulic cylinder and piston lift mechanism mounted adjacent one end of said carriage for bodily movement relative thereto, said mechanism comprising a base having a flat bottom and a cooperating cylinder and piston mounted on said base for extension and retraction in a direction normal to said flat bottom, means on said carriage defining a fluid reservoir, a connection including yieldable restraining means acting between said carriage and said mechanism to permit movement of the latter relative to said carriage from a normal raised position to a load-lifting position in which said flat bottom engages the ground when a downwardly directed load is applied thereto, said carriage and said hydraulic cylinder and piston mechanism being so related that the carriage remains supported by said wheels when said flat bottom is engaged with the ground, and means including flexible conduit for effecting fluid flow between said reservoir and said mechanism for extending and retracting the cylinder and piston independently of the position of said mechanism relative to said carriage.*

References Cited in the file of this patent or the original patent

UNITED STATES PATENTS

| | | |
|---|---|---|
| 2,253,347 | Plymesser | Aug. 19, 1941 |
| 2,366,378 | Barrett | Jan. 2, 1945 |
| 2,411,061 | Saxon | Nov. 12, 1946 |
| 2,456,218 | Semisch | Dec. 14, 1948 |
| 2,522,357 | Framhein | Sept. 12, 1950 |
| 2,537,742 | Collins | Jan. 9, 1951 |
| 2,545,403 | Wrenn | Mar. 13, 1951 |
| 2,559,659 | Redman | July 10, 1951 |
| 2,574,230 | Thress | Nov. 6, 1951 |
| 2,594,270 | Niederhauser | Apr. 22, 1952 |

FOREIGN PATENTS

| | | |
|---|---|---|
| 470,701 | Germany | Jan. 29, 1929 |